US011667729B2

United States Patent
Gibanel et al.

(10) Patent No.: US 11,667,729 B2
(45) Date of Patent: Jun. 6, 2023

(54) LATEX POLYMERS MADE USING METALLIC-BASE-NEUTRALIZED SURFACTANT AND BLUSH-RESISTANT COATING COMPOSITIONS CONTAINING SUCH POLYMERS

(71) Applicant: SWIMC LLC, Cleveland, OH (US)

(72) Inventors: Sebastien Gibanel, Givry (FR); Benoit Prouvost, Nantes (FR)

( * ) Notice: Subject to any disclaimer, the term of this patent is extended or adjusted under 35 U.S.C. 154(b) by 723 days.

(21) Appl. No.: 16/065,294

(22) PCT Filed: Dec. 22, 2016

(86) PCT No.: PCT/US2016/068180
§ 371 (c)(1),
(2) Date: Jun. 22, 2018

(87) PCT Pub. No.: WO2017/112837
PCT Pub. Date: Jun. 29, 2017

(65) Prior Publication Data
US 2020/0385601 A1 Dec. 10, 2020

Related U.S. Application Data

(60) Provisional application No. 62/387,129, filed on Dec. 23, 2015.

(51) Int. Cl.
*C08F 2/24* (2006.01)
*B65D 5/56* (2006.01)
*C09D 125/14* (2006.01)
*C08F 220/18* (2006.01)
*C08F 222/10* (2006.01)

(52) U.S. Cl.
CPC ............... *C08F 2/24* (2013.01); *B65D 5/563* (2013.01); *C09D 125/14* (2013.01); *C08F 220/1802* (2020.02); *C08F 222/1025* (2020.02)

(58) Field of Classification Search
CPC . C08F 2/24; C08F 220/1802; C08F 220/1025
USPC ......................................................... 428/35.8
See application file for complete search history.

(56) References Cited

U.S. PATENT DOCUMENTS

| | | | | |
|---|---|---|---|---|
| 5,539,073 | A * | 7/1996 | Taylor | C08F 222/26 |
| | | | | 525/902 |
| 5,714,539 | A * | 2/1998 | Perez | C08L 51/04 |
| | | | | 525/902 |
| 7,378,479 | B2 | 5/2008 | Tamareselvy et al. | |
| 8,092,876 | B2 | 1/2012 | O'Brien et al. | |
| 8,367,171 | B2 | 2/2013 | Stenson | |
| 10,538,602 | B2 | 1/2020 | Gibanel et al. | |
| 10,800,941 | B2 | 10/2020 | Gibanel et al. | |
| 10,968,288 | B2 | 4/2021 | Gibanel et al. | |
| 11,059,989 | B2 | 7/2021 | DeSousa et al. | |
| 11,332,636 | B2 | 5/2022 | Gibanel et al. | |
| 2002/0155235 | A1 * | 10/2002 | Taylor | C09D 125/14 |
| | | | | 428/35.7 |
| 2010/0068433 | A1 | 3/2010 | Gibanel | |
| 2016/0009941 | A1 * | 1/2016 | Rademacher | C08F 2/22 |
| | | | | 524/745 |
| 2017/0369603 | A1 | 12/2017 | Gibanel et al. | |
| 2018/0265729 | A1 | 9/2018 | Gibanel et al. | |
| 2019/0002724 | A1 | 1/2019 | Sousa et al. | |
| 2019/0249029 | A1 | 8/2019 | Gibanel et al. | |
| 2020/0056066 | A1 | 2/2020 | Gibanel et al. | |
| 2020/0148795 | A1 | 5/2020 | Gibanel et al. | |
| 2020/0148908 | A1 | 5/2020 | Sousa et al. | |
| 2020/0231837 | A1 | 7/2020 | Gibanel et al. | |
| 2020/0392366 | A1 | 12/2020 | Gibanel et al. | |
| 2021/0261696 | A1 | 8/2021 | Gibanel et al. | |
| 2022/0315789 | A1 | 10/2022 | Gibanel et al. | |

FOREIGN PATENT DOCUMENTS

| | | | | |
|---|---|---|---|---|
| CN | | 1703432 A | 11/2005 | |
| CN | | 107690456 A | 5/2016 | |
| CN | | 107683311 A | 2/2018 | |
| WO | WO 2012/089746 | A1 | 7/2012 | |
| WO | WO 2012/089747 | A1 | 7/2012 | |
| WO | WO 2014/089410 | A1 | 6/2014 | |
| WO | WO2014139971 | | 9/2014 | |
| WO | WO-2014139971 | A1 * | 9/2014 | ............... C08F 2/22 |
| WO | WO 2014/186285 | A1 | 11/2014 | |
| WO | WO 2015/002958 | A1 | 1/2015 | |
| WO | WO 2016/105502 | A1 | 6/2016 | |
| WO | WO 2016/105504 | A1 | 6/2016 | |
| WO | WO 2016/196174 | A1 | 12/2016 | |

(Continued)

OTHER PUBLICATIONS

International Search Report and Written Opinion for International Application No. PCT/US2016/068180 dated dated Mar. 21, 2017.
"Guidance for Industry: Preparation of Premarket Submissions for Food Contact Substances (Chemistry Recommendations)," Office of Food Additive and Safety, Food and Drug Administration, FDA Docket No. FDA-2013-S-0610, Dec. 2007. Online [retrieved Nov. 9, 2020], Retrieved from the Internet:<URL:https://www.regulations.gov/docket?D=FDA-2013-S-0610>; 23 pgs.
International Standard ASTM D1957-86 (Reapproved 2001), "Standard Test Method for Hydroxyl Value of Fatty Oils and Acids," 3 pages.
International Standard ASTM D1200-88, (1988), "Standard Test Method for Viscosity by Ford Viscosity Cup," 3 pages.
International Standard ASTM D 3359-17, (2017), "Standard Test Methods for Rating Adhesion by Tape Test," 9 pages.
International Preliminary Report on Patentability for International Application No. PCT/US2016/068180 dated Jun. 26, 2018, 8 pages.

*Primary Examiner* — Michael M. Bernshteyn
(74) *Attorney, Agent, or Firm* — Mueting Raasch Group

(57) ABSTRACT

An aqueous coating composition is provided that is preferably substantially free of bisphenol A. The coating composition is preferably a latex-based coating composition that includes a latex polymer formed from ingredients including an anionic and/or zwitterionic surfactant that includes one or more acid groups neutralized with a metallic base. The coating composition is useful in coating metal substrates such as, for example, interior and/or exterior surfaces of food or beverage containers.

31 Claims, No Drawings

(56) References Cited

FOREIGN PATENT DOCUMENTS

| | | |
|---|---|---|
| WO | WO 2017/112837 A1 | 6/2017 |
| WO | WO 2018/075762 A1 | 4/2018 |
| WO | WO 2018/085052 A1 | 5/2018 |
| WO | WO 2018/085052 A9 | 7/2018 |
| WO | WO 2019/006444 A1 | 1/2019 |

* cited by examiner

LATEX POLYMERS MADE USING METALLIC-BASE-NEUTRALIZED SURFACTANT AND BLUSH-RESISTANT COATING COMPOSITIONS CONTAINING SUCH POLYMERS

CROSS-REFERENCE TO RELATED APPLICATIONS

This application is a national stage entry of PCT Application No. PCT/US2016/068180 filed Dec. 22, 2016 which claims priority to U.S. Provisional Application No. 62/387,129 filed on Dec. 23, 2015 and entitled "LATEX POLYMERS MADE USING METALLIC-BASE-NEUTRALIZED SURFACTANT AND BLUSH-RESISTANT COATING COMPOSITIONS CONTAINING SUCH POLYMERS," both of which are incorporated herein by reference in their entireties.

BACKGROUND OF THE INVENTION

Bisphenol A has been used to prepare polymers having a variety of properties and uses. For example, bisphenol A may be reacted with epichlorohydrin to provide polymers useful in packaging coatings. There is a desire to reduce or eliminate the use of certain bisphenol A-derived polymers in food or beverage container coatings. Although a number of replacement coating compositions made without bisphenol A have been proposed, some replacement compositions have exhibited insufficient coating properties such as insufficient corrosion resistance on metal substrates, insufficient flexibility, insufficient toughness, or insufficient application properties to substrate.

Coatings for use on food or beverage containers should avoid unsuitably altering the taste of the packaged food or beverage products, and should also avoid flaking or chipping into the packaged products. The coatings should also resist chemically aggressive food or beverage products (which can have a complex chemical profile, including salt, acids, sugars, fats, etc.) for extended periods of time (e.g., years). Food or beverage container coatings should also have good adhesion to the underlying substrate and remain sufficiently flexible after curing, because subsequent denting during transportation, storage or use (e.g., by dropping) will cause the metal substrate to deform, which will cause the coating to flex. Some brittle coatings have been observed to crack during flexure, exposing the container metal to the packaged products, which can cause contamination of the packaged products and even cause a leak in the container. Even a low probability of coating failure may cause a significant number of containers to leak, given the large number of manufactured food and beverage containers.

Accordingly, it will be appreciated that what is needed in the art are improved coating compositions that are made without intentionally using bisphenol A, but which exhibit the stringent balance of coating properties to permit the use of such coating compositions on food or beverage containers.

SUMMARY

The present invention includes latex polymers and coating compositions formulated from the latex polymers, methods for making such polymers and coating compositions, methods for coating substrates using the coating compositions, and substrates (e.g., metal food and beverage containers) coated with the coating compositions. In preferred embodiments, the latex polymer is made using at least one metallic-base-neutralized surfactant.

In one aspect, a latex polymer is provided that is preferably formed by polymerizing (e.g., emulsion polymerizing) an ethylenically unsaturated monomer component in an aqueous liquid. The latex polymer is preferably formed using ingredients that include one or more surfactants such as, for example, (a) one or more polymeric surfactants (e.g., polymer salts), (b) one or more "lower" molecular weight surfactants (e.g., (i) non-polymeric surfactants and/or (ii) surfactants having a number average molecular weight of less than about 1,000 Daltons or less than about 500 Daltons), or (c) a combination of (a) and (b). In preferred embodiments, the latex polymer is formed using a first surfactant (and optionally one or more additional "second" surfactants) that constitutes an anionic surfactant, a zwitterionic surfactant, or a mixture thereof, wherein the surfactant preferably includes an acid group, or a plurality of acid groups, neutralized with a metallic base. In one embodiment, the metallic base includes sodium. In preferred embodiments, the latex polymer has a glass transition temperature of at least about 50° C., more typically from about 50 to about 120° C.

In another aspect, latex-based aqueous coating compositions are provided, which are useful on a variety of substrates, and particularly interior and/or exterior surfaces of food or beverage containers such as, e.g., metal food or beverage cans and portions thereof. In preferred embodiments, the latex-based aqueous coating compositions includes at least a film-forming amount of a latex polymer described herein, and more preferably such latex polymer is the predominate binder resin of the coating composition (e.g. constitutes more than 50% of resin solids and as much as 90% or even 99-100% by weight of resin solids). The coating composition is preferably substantially free of each of bisphenol A ("BPA"), bisphenol F ("BPF"), and bisphenol S ("BPS"), including epoxides thereof (e.g., the diglycidyl ether of BPA ("BADGE"), etc.), and preferably exhibits a balance of coating properties in food or beverage can coating end uses that is comparable to conventional coating systems that utilize substantial amounts of BPA. In some embodiments, the coating composition includes less than 10 weight percent by weight solids, if any, of epoxy polymer. In some embodiments, the coating composition is substantially free of one or more of: bisphenols, including epoxides thereof, epoxy polymers, and halogenated monomers (e.g. vinyl chloride and structural units formed therefrom).

Substrates (e.g., metal substrates) having the coating composition of the present invention disposed thereon are also provided. In some embodiments, the substrate is a metal food or beverage can, or portion thereof (e.g., twist-off closure lid, can end, can sidewall and bottom end, etc.) with the coating composition of the present invention applied on an exterior surface, an interior surface, or a combination of both. Certain embodiments of the present invention have been found to be particularly suitable for spray application on the interior of food or beverage cans, including two-piece aluminum or steel beverage cans (e.g., soda or beer cans) or two-piece food drawn and ironed (D&I) cans.

In yet another aspect, the present invention provides a method of coating a metal substrate that preferably includes the steps of receiving a coating composition disclosed herein and applying the coating composition on a metal substrate prior to, or after, forming the metal substrate into a food or beverage container of a portion thereof. Certain embodiments of the coating composition are particularly suitable for spray application to an interior surface of a food or beverage can (e.g., a two-piece aluminum or steel beverage can or a two-piece food D&I can).

The above summary of the present invention is not intended to describe each disclosed embodiment or every implementation of the present invention. The description that follows more particularly exemplifies illustrative embodiments. In several places throughout the application, guidance is provided through lists of examples, which can be used in various combinations. In each instance, the recited list serves only as a representative group and should not be interpreted as limiting or as an exclusive list.

The details of one or more embodiments of the invention are set for in the description below. Other features, objects, and advantages of the invention will be apparent from the description and from the claims.

Selected Definitions

Unless otherwise specified, the following terms as used herein have the meanings as provided below.

The term "ethylenically unsaturated" refers to a carbon-carbon double or triple bond capable of participating in a free-radical initiated emulsion polymerization reaction, and is not intended to encompass the carbon-carbon double bonds present in aryl groups such as, for example, the phenyl group of styrene. Thus, for example, dodecyl benzene sulfonic acid is not considered to include an ethylenically unsaturated group.

The term "on" when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers). Similarly, unless otherwise indicated, the use of a term designating a polymer class such as, for example, "acrylic" is intended to include both homopolymers and copolymers (e.g., polyether-acrylate copolymers).

The term "monomer" includes any reactant molecule used to produce a polymer, and encompasses both single-unit molecules (e.g., an acrylic molecule) and multi-unit molecules (e.g., an acrylic oligomer).

A group that may be the same or different is referred to as being "independently" something. The term "group" also encompasses single atom moieties. Thus, for example, a halogen atom can be a group.

The terms "acrylate" and "acrylic" are used broadly herein and encompasses materials prepared from, for example, one or more of acrylic acid, methacrylic acid, or any acrylate or methacrylate compound. Thus, for example, a homopolymer consisting entirely of polymerized (meth) acrylic acid would still include an "acrylate" polymer even though no (meth)acrylate monomer was employed.

The term "(meth)" as used in "(meth)acrylate", "(meth) acrylic acid", and the like is intended to indicate that either a hydrogen or methyl group may attached to the pertinent carbon atom of the monomer. For example "ethyl (meth) acrylate" encompasses both ethyl acrylate and ethyl methacrylate, as well as mixtures thereof.

The term "substantially free" when used with respect to a coating composition, or polymer or other composition, that may contain a particular compound means that the referenced composition contains less than 1,000 parts per million (ppm) of the recited compound. The term "essentially free" when used with respect to a coating composition, or polymer or other composition, that may contain a particular compound means that the referenced composition contains less than 100 parts per million (ppm) of the recited compound. The term "essentially completely free" when used with respect to a coating composition, or polymer or other composition, that may contain a particular compound means that the referenced composition contains less than 5 parts per million (ppm) of the recited compound. The term "completely free" when used with respect to a coating composition, or a polymer or other composition, that may contain a particular compound means that the referenced composition contains less than 20 parts per billion (ppb) of the recited compound. The above concentrations factor in the total amount of compound present in the composition whether the compound is mobile in the composition (e.g., not bound to another constituent and capable of being extracted), bound to a constituent of the composition, or present in both mobile and bound forms. When the phrases "free of" (outside the context of the aforementioned phrases), "does not include any" and the like are used herein, such phrases are not intended to preclude the presence of trace amounts of the pertinent structure or compound which may be present, e.g., as environmental contaminants.

The term "styrene-free" indicates that styrene was not intentionally used, although trace amounts of contaminating styrene may be present (e.g., due to environmental contamination).

The term "epoxy polymer" does not refer to any polymer having an epoxy functional group. Rather, it is used to describe a category of polymers having "epoxy backbone segments" (i.e., segments formed from reaction of an epoxy group and a group reactive with an epoxy group). Thus, for example, a polymer having backbone segments that are the reaction product of a bisphenol (e.g., bisphenol A, bisphenol F, bisphenol S, etc.) and a halohdyrin (e.g., epichlorohydrin) would be considered an epoxy polymer. By way of further example, a polymer having backbone segments that are the reaction product of a diepoxide (e.g., a diglycidyl ether compound) and a diphenol (e.g., a bisphenol such as bisphenol A, bisphenol F, bisphenol S, etc.) would be considered an epoxy polymer. However, a vinyl polymer formed from vinyl monomers and/or oligomers that include an epoxy moiety (e.g., glycidyl methacrylate) would not be considered an epoxy polymer as it does not include epoxy backbone segments.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" in dictates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

As used herein, the term "or" is generally employed in its usual sense including "and/or" unless the content clearly dictates otherwise.

The term "and/or" means one or all of the listed elements or a combination of any two or more of the listed elements.

As used herein, "a," "an," "the," "at least one," and "one or more" are used interchangeably. Thus, for example, a coating composition that comprises "a" surfactant can be interpreted to mean that the coating composition includes "one or more" surfactants.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 4 to 5, etc.).

DETAILED DESCRIPTION

The aqueous coating composition of the present invention is a latex-based coating composition that preferably includes a latex polymer formed by a polymerization process that employs a "first" surfactant optionally in combination with one or more additional surfactants (e.g., one or more "second" surfactants). In preferred embodiments, the latex polymer is formed by emulsion polymerizing an ethylenically unsaturated monomer component in the presence of the first surfactant. The first surfactant may be a single surfactant or a mixture of two or more different surfactants.

While any suitable emulsion polymerization process may be employed, in preferred embodiment an aqueous monomer emulsion (or "pre-emulsion") is first prepared from ingredients including the ethylenically unsaturated monomer component, the first surfactant, and an aqueous carrier. The ethylenically unsaturated monomer component is then preferably emulsion polymerized in the presence of the first surfactant to form the latex polymer. One or more initiators are typically employed in the emulsion polymerization to facilitate free-radical polymerization of the ethylenically unsaturated monomer component and formation of a latex polymer.

The first surfactant can be any suitable type of surfactant and may, for example, be a "lower" molecular-weight surfactant (e.g., a surfactant that is non-polymeric and/or has a number average molecular weight of less than about 1,000 Daltons, more typically less than about 750 Daltons, and even more typically less than about 500 Daltons).

It is also well within the scope of the present invention to use a polymeric surfactant having, for example, a number average molecular weight greater than about 2,000 Daltons or even greater than about 4,000 Daltons. In fact, it is generally preferable to use a polymeric surfactant and/or a polymerizable surfactant to, for example, minimize or eliminate the possibility of surfactant migrating out of the cured coating and into the packaged product. Examples of suitable polymeric surfactants may include polymeric salts of the acrylic, alkyd, polyester, polyether, polyolefin, or polyurethane type, including copolymers thereof (e.g., polyether-acrylate copolymers), and mixtures thereof. Examples of suitable such polymer salts are disclosed in U.S. Pat. No. 8,092,876. An example of a specific polymeric surfactant is a "higher" acid number acid-functional acrylic polymer (e.g., acid number greater than about 40, more preferably greater than about 100 milligrams KOH per gram polymer) that is solution polymerized in organic solvent and then inverted into water and used to support emulsion polymerization of the ethylenically unsaturated monomer component. In some embodiments, no polymeric surfactant is used in emulsion polymerizing the latex polymer.

Nonetheless, in some embodiments, the coating composition of the present invention, based on total resin solids, includes less than 1 weight percent, if any, of polymeric surfactant. For purposes of this paragraph, the term "polymeric surfactant" is not intended to encompass an initial or intermediate emulsion polymerized stage of a latex polymer that is made by emulsion polymerizing monomers including acid-functional ethylenically unsaturated monomers.

In certain preferred embodiments, the first surfactant is an amphiphilic compound that includes at least one non-polar "tail" (e.g., a hydrocarbon chain or group such as an alkyl chain, alkenyl chain, cycloalkyl group, cycloalkenyl group, or combination thereof) and at least one polar or ionic "head" (e.g., a salt group such as a neutralized acid or base group).

The first surfactant is preferably an anionic, a cationic or a zwitterionic surfactant.

In preferred embodiments, the first surfactant includes one or more acid groups that have been neutralized with a metallic base. Examples of neutralized acid groups include carboxylate groups (—COO—), sulfate groups (—OSO3—), sulfinate groups (—SOO—), sulfonate groups (—SO2O—), phosphate groups (~OPO3-), phosphinate groups (—POO—), phosphonate groups (—PO3-), and combinations thereof.

In some embodiments, it may be useful to use a first surfactant that is a "strong acid" surfactant prior to neutralization. Examples of "strong acid" surfactants include surfactants having a pKa of less than 4 prior to neutralization.

Although the first surfactant may optionally include one or more ethylenically unsaturated groups (e.g., if the surfactant is a polymerizable surfactant), in some embodiments, the first surfactant is a saturated surfactant. By way of example, sodium dodecylbenzenesulfonate is considered to be a saturated surfactant. Although sodium dodecylbenzenesulfonate includes an aryl group that includes carbon-carbon double bonds, it does not include any ethylenically unsaturated groups.

In some embodiments, the first surfactant includes one or more heteroatoms (e.g., atoms other than carbon or hydrogen such as N, O, S, P, Si, etc.) in a portion other than an acid or neutralized acid group. For example, the surfactant may include one or more, two or more, three or more, or four or more carbonyl groups. In some embodiments, the first surfactant includes one or more, two or more, three or more, or four or more heteroatom-containing linkages (e.g., amide, carbonate, ether, ester, urea, urethane, condensation linkages not already recited in this list, and the like), more preferably one or more ester linkages.

In some embodiments, the first surfactant includes two or more portions including a heteroatom, more preferably heteroatom-containing linkages such as, for example, two or more ester linkages in which a salt group (e.g., a metallicbase-neutralized acid group such as a metallic-base-neutralized sulfonate group) is optionally located between the two heteroatom-containing linkages. Dioctyl sodium sulfosuccinate is an example of such a surfactant.

In some embodiments, the first surfactant includes one or more ester linkages or other heteroatom-containing linkages in close proximity (e.g., immediately adjacent or separated by one or more, two or more, or three or more atoms) to a salt group (e.g., an acid group neutralized with a metallic base). Dioctyl sodium sulfosuccinate is an example of such a surfactant.

In some embodiments, the surfactant includes one or more substituted or unsubstituted hydrophobic chains, such as, for example, alkyl or alkenyl chains (which may optionally include one or more cyclic groups such as cycloaliphatic groups) that include at least 4, at least 5, at least 6, at least 7, at least 8, at least 9, or 10 or more carbon atoms.

Examples of suitable anionic surfactants includes any of the following surfactants, which preferably have been neutralized with a metallic base: any of the acid- or anhydride-functional polymeric surfactants disclosed herein, dodecylbenzene sulfonic acid, dinonylnaphthalene sulfonic acid, dinonylnaphthylenedisulfonic acid, bis(2-ethylhexyl)sulfosuccinic acid, dioctyl sulfosuccinic acid, sodium lauryl sulfate, sodium dodecyl sulfate, sodium laureth sulfate, fatty acid (ester) sulfonate, polyaryl ether phosphate acid or sulfonate acid, and the like, including mixtures thereof.

Examples of suitable polymerizable surfactants include those disclosed in U.S. Publication No. 2002/0155235; and those commercially available under the tradename "REASOAP" from Adeka Corporation, Tokyo, Japan., under the tradenames "NOIGEN" and "HITENOL" from Da-Ichi Kogyo Siyyaku Co., Ltd., Tokyo, Japan; and under the tradename "SIPOMER" from Solvay Rhodia, Brussels, Belgium.

In some embodiments, the first surfactant is a sulfosuccinate-type surfactant (e.g., a surfactant derived from ingredients including succinic acid or anhydride). In some such embodiments, the sulfo-succinate-type surfactant is a sodium sulfosuccinate (e.g., dioctyl sodium sulfosuccinate). The structure of dioctyl sodium sulfosuccinate after neutralization with a sodium-containing base such as NaOH is depicted below for illustrative purposes. It should be noted that the "O" and "Na" are not indicated to be covalently attached to one another in the below structural representation.

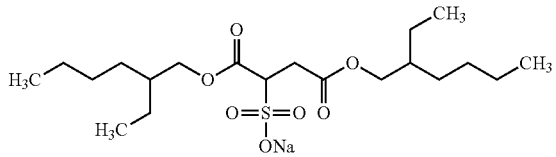

The metallic base may include any suitable metal atom or atoms. Typically, however, the metallic base includes one or more of aluminum, calcium, lithium, magnesium, sodium, potassium. Examples of suitable metallic bases include calcium hydroxide, lithium hydroxide, magnesium hydroxide, potassium hydroxide, sodium hydroxide, and combinations thereof. Sodium hydroxide (NaOH) is preferred in some embodiments.

In one embodiment, the first surfactant is dioctyl sodium sulfosuccinate. Dioctyl sodium sulfosuccinate is commercially available from a variety of manufacturers in a variety of different product offerings, including, for example, the AEROSOL OT 70 and OT 75 line of products commercially available from Cytec Industries, Inc.

In preferred embodiments, at least 0.05 weight percent (wt. %), more preferably at least 0.1 wt. %, and even more preferably at 0.5 wt. % of first surfactant is used to make the latex polymer. In embodiments in which the first surfactant is a "lower" molecular weight surfactant (e.g., has a number average molecular weight of less than about 1,000 Dalton or less than about 500 Daltons), typically less than 15 wt. %, more typically less than 10 wt. %, and even more typically less than 5 wt. % is employed in making the latex polymer. The wt. %'s referenced in this paragraph are based on the total combined weight of first surfactant and ethylenically unsaturated monomer component used to make the latex polymer. For purposes of this paragraph, the "first surfactant" refers to any "lower" molecular weight surfactant used to make the latex polymer that includes an acid group neutralized with a metallic base.

In embodiments, in which a second surfactant is employed in addition to the one or more first surfactant, any number of such second surfactants may be employed (e.g., 1, 2, 3, or 4 or more). The second surfactant can be any type of surfactant disclosed herein or any other suitable type of surfactant. Thus, for example, the second surfactant can be an anionic or zwitterionic surfactant in which one or more acid groups have been neutralized with a base other than a metallic base such as, for example, a fugitive base. Fugitive bases typically include a nitrogen atom, with ammonia and primary, secondary, and tertiary amines being examples of such bases.

The term "fugitive", when used in the context of a base, generally refers to a base that is not appreciably present (e.g., less than 1 weight percent, if any, remains) in the coating composition after thermal cure of the coating composition to form a cured coating. In contrast, metallic bases such as, for example, sodium hydroxide are appreciably retained within the coating even after thermal cure. The presence of residual levels of metal ions such as sodium ions in cured interior food or beverage can coatings is generally considered to be unsuitable by those of skill in the art due to coating blush problems and other coating defects that have generally been thought to arise from the presence of such metals. Thus, it was a surprising and unexpected result that the use of surfactants having acid groups neutralized with metallic bases in coating compositions of the present invention did not result in cured coatings formed therefrom that exhibited unsuitable amounts of coating blush (sensitivity to water that causes whitening of the coatings) or other coating defects. While not intending to be bound by any theory, it is believed that one or more of the following may contribute to the surprising and unexpected results: (i) the selection of an ethylenically unsaturated monomer mix that yields a relatively "high" Tg latex polymer, (ii) the selection of a first surfactant that has a relatively high affinity for metal ions, (iii) the use of a suitable amount of a suitable crosslinker (e.g., phenolic crosslinker), and/or (iv) the use of a suitable amount of multi-ethylenically unsaturated monomer in making the latex polymer.

In embodiments that employ a second surfactant, the first and second surfactants are preferably not oppositely charged relative to one another. Thus, for example, if the first surfactant is an anionic surfactant, the second surfactant is preferably an anionic, zwitterionic, or non-ionic surfactant, and more preferably an anionic or non-ionic surfactant.

In some embodiments, a non-ionic second surfactant is included in the reaction mixture used to make the latex polymer. Any suitable non-ionic surfactant may be employed. Examples of suitable non-ionic surfactants include ethoxylated compounds.

In some embodiments, the non-ionic compound is a sucrose ester, sorbitan ester, alkyl glycoside, glycerol ester, or mixture thereof. In some embodiments, a non-ionic surfactant is used that includes hydroxyl groups. Non-ionic surfactants that comprise, or are derived from, polysorbate compounds are preferred in some embodiments, with polyoxyethylene (20) sorbitan monolaurate (e.g., TWEEN 20) being an example of a preferred non-ionic surfactant.

The ethylenically unsaturated monomer component can be composed of a single monomer or a mixture of monomers. More typically, a mixture of monomers is used. Suitable ethylenically unsaturated monomers include one or more: "acrylic monomers" (e.g., (meth)acrylate monomers, (meth)acrylic acid, and the like), vinyl monomers (including, e.g., vinyl aromatic monomers, vinyl ester monomers, vinyl monomers having reactive functional groups, etc.), alkyl esters of maleic or fumaric acid, or any other suitable ethylenically unsaturated compounds.

In preferred embodiments the ethylenically unsaturated monomer component includes at least one (meth)acrylate monomer, and more typically at least one alkyl (meth) acrylate. Suitable (meth)acrylates include any of those referenced herein, as well as those having the structure: $CH_2=C(R')-CO-OR^2$ wherein $R^1$ is hydrogen or methyl, and $R^2$ is an organic groups such as, e.g., an alkyl group preferably containing one to sixteen carbon atoms, a cycloaliphatic group, an aryl group (e.g., a benzyl group), or a combination thereof. If desired, $R^2$ may optionally be substituted with one or more (e.g., one to three) moieties such as hydroxy, halo, phenyl, alkoxy, carbonyl groups or other oxygen-containing groups, and nitrogen-containing groups (e.g., amino groups), for example. Examples of suitable (meth)acrylates (including, e.g., suitable alkyl (meth)acrylates) include methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, benzyl (meth)acrylate, lauryl (meth)acrylate, isobornyl (meth)acrylate, octyl (meth)acrylate, nonyl (meth)acrylate, hydroxyethyl (meth) acrylate, hydroxypropyl (meth)acrylate, and the like, and isomers and mixtures thereof.

Examples of suitable vinyl monomers include styrene, methyl styrene, halostyrene, isoprene, diallylphthalate, divinylbenzene, conjugated butadiene, alpha-methylstyrene, vinyl toluene, vinyl naphthalene, acrylonitrile, acrylamide, methacrylamide, methacrylonitrile, vinyl acetate, vinyl propionate, vinyl butyrate, vinyl stearate, N-isobutoxymethyl acrylamide, N-butoxymethyl acrylamide and the like, vinyl esters, and mixtures thereof.

In some embodiments, the ethylenically unsaturated monomer component optionally includes one or more vinyl aromatic compounds (e.g., styrene, vinyl toluene, benzyl (meth)acrylate, and the like). Such vinyl aromatic compounds may be employed in any suitable amount. In some embodiments, the ethylenically unsaturated monomer component includes at least 10, at least 20, at least 30, at least 40, or at least 50% by weight or more of one or more vinyl aromatic compounds. The upper amount of vinyl aromatic compound in the ethylenically unsaturated monomer component is not restricted, although it will typically include less than 80, less than 70, or less than 60% by weight, if any.

In some embodiments, the latex polymer preferably includes one or more types of reactive functional groups. Thus, in some embodiments, the ethylenically unsaturated monomer component includes one or more ethylenically unsaturated monomers having one or reactive functional groups. Such reactive functional groups may be desirable, for example, for purposes of undergoing reactions within the latex polymer itself, with another latex polymer particle, and/or with another component of the coating composition such as, e.g., a crosslinker. Examples of suitable reactive functional groups may include any functional group capable of reacting with another complimentary functional group under suitable conditions to form a covalent linkage (e.g., a condensation linkage). Some specific examples of suitable such reactive functional groups may include hydroxyl, carboxyl, amino, acetoacetoxy, carbonate, epoxy, oxazoline, carbodiimide, and combinations thereof.

In some embodiments, the coating composition is formulated using an acrylic latex polymer that is at least substantially free of styrene or even styrene-free. In such embodiments, the coating composition is also preferably styrene-free. In some embodiments, the latex polymer, and preferably also the coating composition, is also substantially free of substituted styrene compounds (e.g., alpha-methylstyrene, methyl styrenes (e.g., 2-methyl styrene, 4-methyl styrene, vinyl toluene, and the like), dimethyl styrenes (e.g., 2,4-dimethyl styrene), trans-beta-styrene, divinylbenzene, and the like). Examples of ethylenically unsaturated monomers that may be used in place of styrene are disclosed in U.S. Prov. App. No. 64/410,255 filed on Oct. 19, 2016.

One or more multi-functional monomers may optionally be included in the ethylenically unsaturated monomer component. Examples of preferred multi-functional monomers include multi-ethylenically unsaturated monomers such as multi-ethylenically-unsaturated (meth)acrylates. Examples of multi-ethylenically unsaturated (meth)acrylates include polyhydric alcohol esters of acrylic acid or methacrylic acid, such as ethanediol di(meth)acrylate, propanediol di(meth) acrylate, butanediol di(meth)acrylate (e.g., 1,3-butanediol di(meth)acrylate and 1,4-butanediol di(meth)acrylate), heptanediol di(meth)acrylate, hexanediol di(meth)acrylate, trimethylolethane tri(meth)acrylate trimethylolpropane tri (meth)acrylate, trimethylolbutane tri(meth)acrylate, trimethylolheptane tri(meth)acrylate, trimethylolhexane tri(meth) acrylate, tetramethylol methane tetra(meth)acrylate, dipropylene glycol di(meth)acrylate, trimethylol hexane tri (meth)acrylate, pentaerythritol tetra(meth)acrylate, isosorbide di(meth)acrylate, ally (meth)acrylate, glycerol dimethacrylate, and mixtures thereof. Examples of multi-ethylenically-unsaturated monomers other than (meth) acrylates include diallyl phthalate, divinylbenzene, divinyltoluene, divinylnaphthalene, and mixtures thereof.

In one embodiment, 1,4-butanediol di(meth)acrylate is included in the ethylenically unsaturated monomer component.

In some embodiments, the ethylenically unsaturated monomer component includes at least 5%, at least 6%, at least 7%, at least 8%, at least 9%, at least 10%, at least 11%, at least 12%, at least 13%, or at least 14% by weight of multi-ethylenically unsaturated monomer. If used, such multi-ethylenically unsaturated monomers will typically be included in the ethylenically unsaturated monomer component in an amount of less than about 25 wt. %, more typically less than about 20 wt. %, and even more typically less than about 17.5 wt. %. In some embodiments, di(meth)acrylates are preferred multi-ethylenically unsaturated monomers.

It should be noted that certain monomers such as, for example, benzyl (meth)acrylate are both a (meth)acrylate monomer and a vinyl aromatic monomer. In such situations, such aromatic (meth)acrylate monomer should be considered as falling within the applicable concentration ranges specified for both (meth)acrylate monomers and vinyl aromatic monomers. Similar treatment should be given to other monomers that fall within two or more described categories such as, for example, (meth)acrylates having two or more ethylenically unsaturated groups, which are therefore also multi-ethylenically unsaturated monomers.

Typically, (meth)acrylates (e.g., one or a mixture of two or more (meth)acrylates) will constitute a substantial portion of the emulsion polymerized ethylenically unsaturated monomer component. In some embodiments, (meth)acrylates constitute at least 20 wt. %, at least 30 wt. %, at least 50 wt. %, or even at least 70 wt. % or more of the emulsion polymerized ethylenically unsaturated monomer component. In some embodiments, alkyl (meth)acrylates constitute at least 20 wt. %, at least 30 wt. %, at least 50 wt. %, or at least 70 wt. % or more of the emulsion polymerized ethylenically unsaturated monomer component.

In some embodiments, the ethylenically unsaturated monomer component may include a small amount (e.g., less than 10 wt. %, less than 5 wt. %, less than 2 wt. %, or less than 1 wt. %), if any, of acid- or anhydride-functional ethylenically unsaturated monomer.

Suitable acid-functional monomers include ethylenically unsaturated acids (e.g., mono-protic or diprotic), anhydrides or monoesters of a dibasic acids. Illustrative monobasic acids are those represented by the structure $CH_2$=$C(R3)$-COOH, where R3 is hydrogen or an alkyl radical of 1 to 6 carbon atoms. Suitable dibasic acids are those represented by the formulas R4(COOH)C=C(COOH)R5 and R4(R5)C=C(COOH)R6COOH, where R4 and R5 are hydrogen, an alkyl radical of 1-8 carbon atoms, halogen, cycloalkyl of 3 to 7 carbon atoms or phenyl, and R6 is an alkylene radical of 1 to 6 carbon atoms. Half-esters of these acids with alkanols of 1 to 8 carbon atoms are also suitable.

Examples of ethylenically unsaturated acid-functional monomers include acids such as, for example, acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, or mixtures thereof. Examples of suitable ethylenically unsaturated anhydride monomers include compounds derived from the above acids (e.g., as pure anhydride or mixtures of such).

The ethylenically unsaturated monomer component may also include any other suitable monomers in any suitable amounts.

In some embodiments, the ethylenically unsaturated monomer component does not contain any oxirane-group containing monomer (e.g., glycidyl (meth)acrylate). Thus, in some embodiments the latex polymer is substantially free of oxirane-group containing monomers.

In presently preferred embodiments, the ethylenically unsaturated monomer component does not include any acrylamide-type monomers (e.g., acrylamides or methacrylamides). Thus, in some embodiments the latex polymer is substantially free of acrylamide-type monomers.

The latex polymer of the present invention may exhibit any suitable glass transition (Tg) value(s). In some embodiments, it may be desirable that the latex polymer has a relatively "high" Tg, such as interior can coatings that will be exposed to sensitive flavor products (e.g., certain colas in which certain flavorants are present at very low concentrations) and/or chemically aggressive food or beverage products (e.g., high acid, high salt, and/or high fat). While not intending to be bound by any theory, such a "high" Tg can be beneficial from one or more of the following perspectives: (i) decreased flavor scalping by the cured coating and/or (ii) enhanced chemical resistance exhibited by the cured coating. In such embodiments, preferred glass transition temperatures for the latex polymer include those greater than about 50° C., more preferably greater than about 60° C., even more preferably greater than about 70° C., and in some embodiments, greater than about 80° C. Preferred glass transition temperatures for latex polymer include those less than about 120° C., more preferably less than about 115° C., even more preferably less than about 110° C., and in some embodiments, less than about 100° C. The term "latex polymer" is used broadly in the above Tg discussion and is also intended to include latex particles that include, for example, two polymers that are not covalently attached. An example of such a latex particle is one that includes a polymeric surfactant and a polymer resulting from emulsion polymerization of the ethylenically unsaturated component, wherein the two polymers are not covalently attached to one another.

Differential scanning calorimetry (DSC) is an example of a useful method for determining the Tg of the latex polymer/particle, with a representative DSC methodology provided in the tests method section described below.

It should be noted that it may not be possible to measure a discrete Tg for certain latex polymers. For example, this may be the case for a gradient Tg latex polymer, which can contain an almost infinite number of Tg stages. For example, one may start with a high Tg monomer composition and then at a certain point in the polymerization start to feed a lower Tg stage monomer composition into the high Tg stage monomer feed. The resulting multistage latex polymer will have a gradient Tg from high to low. A "power feed" process may be used to prepare such compositions. A gradient Tg polymer may also be used in conjunction with multiple multistage Tg polymers. As an example, one may prepare a high Tg monomer feed (F1) and a low Tg monomer feed (F2). One would begin to feed F1 into the latex reactor vessel and initiate polymerization. At a certain period during the F1 feed, one would then feed F2 into F1 wherein the F2 feed rate is faster than the overall feed rate of F1+F2 into the reactor vessel. Consequently, once the F2 feed into F1 is complete, the overall Tg of the F1+F2 monomer feed blend will be a lower Tg "soft stage" monomer composition. For such gradient Tg latex polymers, the Fox equation may be used instead of DSC to calculate Tg. If the monomers used to produce such a latex polymer include one or more monomers not having a homopolymer Tg (e.g., because the monomer does not homopolymerize), then a non-gradient reference latex can be made, in a non-power feed method, using the same overall monomer composition and used to measure Tg.

The overall latex polymer may have any suitable acid number so long as the polymer is preferably capable of being stably dispersed into water. While not intending to be bound by any theory, it is believed that the presence of at least some acid groups in the latex polymer is desirable, for example, to enhance the liquid stability of the varnish and crosslinking of the resin system.

In certain preferred embodiments, the latex polymer includes hydroxyl groups. While not intending to be bound by any theory, it is believed that the presence of a suitable amount of hydroxyl groups in the latex polymer may improve the pot life stability of certain latex polymers depending upon the makeup of the aqueous carrier (e.g., depending upon which, if any, organic solvents that may be present). For example, in some embodiments, the presence of hydroxyl groups in the latex polymer has been observed to help increase the stability of the latex polymer when stored for extended periods of time, including, for example, at elevated temperatures (e.g., stored 1 month at a temperature of 40° C. without a substantial change in viscosity).

The latex polymer may have any suitable hydroxyl number to achieve the desired result. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art. See, for example, ASTM D1957-86 (Reapproved 2001) entitled "Standard Test Method for Hydroxyl Value of Fatty Oils and Acids" and available from the American Society for Testing and Materials International of West Conshohocken, Pa. Alternatively, hydroxyl number may be theoretically determined based on the reactant monomers.

In some embodiments, the ethylenically unsaturated monomer component includes at least 0.1%, at least 1%, at least 2%, at least 5%, at least 8%, or 10% by weight or more of hydroxyl-functional ethylenically unsaturated monomer. Examples of suitable such monomers include hydroxyethyl (meth)acrylate, hydroxypropyl (meth)acrylate, hydroxybutyl (meth)acrylate, other hydroxyl alkyl (meth)acrylates, glycerol monomethacrylate, and mixtures thereof. If used, such hydroxyl-functional monomers will typically be included in the ethylenically unsaturated monomer component in an amount of less than about 30 wt. %, more typically less than about 20 wt. %, and even more typically less than about 15 wt. %.

The latex polymer may be of any suitable molecular weight. In some embodiments, the latex polymer has a number average molecular weight (Mn) of at least about 100,000, at least about 200,000, or at least about 300,000. The upper range of the Mn of the latex polymer is not restricted and may be 1,000,000 or more. In certain embodiments, however, the Mn of the latex polymer is less than about 1,000,000, or less than about 600,000. Because in some embodiments the molecular weight may be too high to measure (e.g., via GPC), it may be necessary to determine the number average molecular weight via theoretical calculation.

The emulsion polymerization process may be conducted in a variety of manners. Any suitable process or materials may be employed in making the latex polymer.

In some preferred embodiments, the emulsion polymerization process uses a pre-emulsion monomer mixture in which some or all of the reactant components and one or more surfactants (e.g., the first surfactant) are dispersed in an aqueous carrier under agitation to form a stable pre-emulsion.

A portion of the surfactant(s) and a portion of the aqueous carrier may also be introduced into a reactor, and are preferably heated, agitated, and held under nitrogen sparge to assist in the subsequent polymerization reactions. Preferred temperatures for heating the surfactant dispersion include temperatures greater than about 65° C., and more preferably from about 70° C. to about 90° C.

The pre-emulsion may then be fed to the heated aqueous dispersion in the reactor incrementally or continuously over time. Alternatively, in certain embodiments a batch or semi-batch process may be used to polymerize the reactant monomers in the aqueous dispersion, as described in, for example, U.S. Pat. No. 8,092,876. In further embodiments, the polymerization process can occur in a classic two-stage (or multiple stage) core-shell arrangement. Alternatively, the polymerization process can occur in a multiple stage "inverse core shell" arrangement as discussed in International Publication No. WO2015/002958. Intermediate hybrids of these processes may also be used.

With regard to the conditions of the emulsion polymerization, the ethylenically unsaturated monomer component is preferably polymerized in aqueous medium with a water-soluble free radical initiator.

The temperature of polymerization is typically from 0° C. to 100° C., preferably from 50° C. to 90° C., more preferably from 70° C. to 90° C., and even more preferably from about 80° C. to about 85° C. The pH of the aqueous medium is usually maintained at a pH of 5 to 12.

The free radical initiator can be selected, for example, from one or more water-soluble peroxides which are known to act as free radical initiators. Examples include hydrogen peroxide and t-butyl hydroperoxide. Redox initiator systems well known in the art (e.g., t-butyl hydroperoxide, erythorbic acid, and ferrous complexes) can also be employed.

Further examples of polymerization initiators which can be employed include polymerization initiators which thermally decompose at the polymerization temperature to generate free radicals. Examples include both water-soluble and water-insoluble species. Further examples of free radical initiators that can be used include persulfates, such as ammonium or alkali metal (potassium, sodium or lithium) persulfate; azo compounds such as 2,2'-azo-bis(isobutyronitrile), 2,2'-azo-bis(2,4-dimethylvaleronitrile), and 1-t-butyl-azocyanocyclohexane; hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; perphosphates, and the like; and combinations thereof.

Polymerization initiators can be used alone or as the oxidizing component of a redox system, which also preferably includes a reducing component such as ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, benzoin and combinations thereof. The reducing component is frequently referred to as an accelerator or a catalyst activator.

The initiator and accelerator (if any) are preferably used in proportion from about 0.001% to 5% each, based on the weight of monomers to be copolymerized. Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe(II), and ammonium persulfate/sodium bisulfite/sodium hydrosulfite/Fe(II).

Chain transfer agents can be used to control polymer molecular weight, if desired.

The polymerization reaction of the ethylenically unsaturated monomer component in the presence of the first surfactant and any optional additional surfactant(s) (e.g., the second surfactant) as a batch, intermittent, or continuous operation.

In some embodiments, the reactor is charged with an appropriate amount of water, surfactant (e.g., the first and/or second surfactant), and free radical initiator. The reactor is then heated to the free radical initiation temperature and then charged with the ethylenically unsaturated monomer component. In some embodiments, only water, initiator, surfactant (e.g., the first surfactant and/or second surfactant), and some portion of the ethylenically unsaturated monomer component are initially charged to the vessel. There may also be some water miscible solvent present. After this initial charge is allowed to react for a period of time at polymerization temperature, the remaining ethylenically unsaturated monomer component is added incrementally with the rate of addition being varied depending on the polymerization temperature, the particular initiator being employed, and the type and amount of monomers being polymerized. After all the monomer component has been charged, a final heating is carried out to complete the polymerization. The reactor is then cooled and the latex recovered.

In certain preferred embodiments, an aqueous monomer "pre-emulsion" containing the ethylenically unsaturated monomer component is formed prior to the onset of polymerization and, more preferably prior to the addition of initiator. The pre-emulsion is preferably formed from ingredients including a surfactant (e.g., the first and/or second surfactant), water, and at least a portion of the ethylenically unsaturated monomer component. The pre-emulsion is preferably sufficiently mixed, or otherwise processed, such that a homogenous aqueous solution is formed.

In some embodiments, the first and/or second surfactants are added in one or more steps (e.g., two steps or three or more steps) at the same or different times.

The emulsion polymerization may continue for a suitable duration to polymerize the reactant components with a free-radical initiated polymerization process. This can produce each latex polymer as a particle dispersed or otherwise suspended in the aqueous solution. And, in some embodiments, where each latex polymer has linear and/or branched copolymer chains that are preferably cross-linked with linkages derived from multi-unsaturated monomers.

After the polymerization is completed, at least a portion of the carboxylic acid groups and/or anhydride groups of the latex polymer (or other salt-forming groups such as, e.g., other neutralizable acid groups and/or neutralizable base groups) may be neutralized or partially neutralized with a suitable basic compound (or other suitable neutralizing compound) to produce water-dispersing groups. The basic compound used for neutralization can be a metallic base, a fugitive base (e.g., ammonia and primary, secondary, and/or tertiary amines), or a mixture thereof.

Some examples of suitable amines are trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Triethyl amine and dimethyl ethanol amine are preferred amines.

The degree of neutralization may vary considerably depending upon the amount of acid or base groups included in the latex polymer, and the degree of dispersibility that is desired. In embodiments in which neutralized acid groups are used for water dispersibility, preferred acid numbers for the overall latex polymer prior to neutralization include acid numbers greater than about 20, more preferably greater than about 60, or even greater than about 80 or about 120 milligrams (mg) potassium hydroxide (KOH) per gram of the latex polymer. Acid numbers may be calculated pursuant to BS EN ISO 3682-1998 standard, or alternatively may be theoretically determined based on the reactant monomers. The above acid numbers are inclusive of any acid- or anhydride-functional polymeric surfactant(s) incorporated into the latex polymer/particle, regardless of whether the polymeric surfactant(s) are covalently attached to the emulsion polymerized ethylenically unsaturated monomer component. The above acid numbers do not include any surfactant that is both non-polymeric and non-polymerizable which may have been used to produce the latex polymer. Neutralized dodecyl benzene sulfonic acid is an example of such a non-polymeric and non-polymerizable surfactant.

Coating compositions of the present invention preferably include at least a film-forming amount of the latex polymer described herein. In preferred embodiments, the coating composition includes at least about 50 wt. %, more preferably at least about 65 wt. %, and even more preferably at least about 80 wt. % or at least about 90 wt. % of the latex polymer, based on the total resin solids weight of the coating composition. The coating composition includes 100 wt. % or less, more typically less than about 99 wt. %, and even more typically less than about 95 wt. % of the latex polymer system, based on the total resin solids weight of the coating composition.

In some embodiments, the coating composition may include one or more epoxy polymers (including, e.g., one or more epoxy polymer derived from bisphenol(s)). Typically, however, the coating composition will include, based on total resin solids, less than 10 wt. %, less than 5 wt. %, or less than 1 wt. %, if any, epoxy polymers. In presently preferred embodiments, the coating composition is made without the use of any epoxy polymers.

The coating composition may be formulated from the latex emulsion, optionally with the inclusion of one or more additives and/or by rheological modification for different coating applications (e.g., diluted for spray coating applications). In embodiments in which the coating composition includes one or more additives, the additives preferably do not adversely affect the latex emulsion, or a cured coating formed from the coating composition. For example, such optional additives may be included in the coating composition to enhance composition aesthetics, to facilitate manufacturing, processing, handling, and application of the composition, and to further improve a particular functional property of the coating composition or a cured coating resulting therefrom.

Such optional additives include, for example, catalysts, dyes, pigments, toners, extenders, fillers, lubricants, anticorrosion agents, flow-control agents, thixotropic agents, dispersing agents, antioxidants, adhesion promoters, light stabilizers, co-resins and mixtures thereof. Each optional additives is preferably included in a sufficient amount to serve its intended purpose, but not in such an amount to adversely affect the coating composition or a cured coating resulting therefrom.

One preferred optional additive is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin, titanium, and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art.

If used, the catalyst is preferably present in an amount of at least about 0.01% by weight, and more preferably at least about 0.1% by weight, based on the total solids weight of the coating composition. Furthermore, if used, the catalyst is also preferably present in a non-volatile amount of no greater than about 3% by weight, and more preferably no greater than about 1% by weight, based on the total solids weight of the coating composition.

Another useful optional ingredient is a lubricant (e.g., a wax), which facilitates manufacture of metal closures and other fabricated coated articles by imparting lubricity to sheets of coated metal substrate. Preferred lubricants include, for example, Carnauba wax and polyethylene-type lubricants. If used, a lubricant is preferably present in the coating composition in an amount of at least about 0.1% by weight, and preferably no greater than about 2% by weight, and more preferably no greater than about 1% by weight, based on the total solids weight of the coating composition.

Another useful optional ingredient is an organosilicon material, such as a siloxane-based and/or polysilicone-based material. Representative examples of suitable such materials are disclosed in International Publication Nos. WO/2014/089410 and WO/2014/186285.

Another useful optional ingredient is a pigment, such as titanium dioxide. If used, a pigment is present in the coating composition in an amount of no greater than about 70% by weight, more preferably no greater than about 50% by weight, and even more preferably no greater than about 40% by weight, based on the total solids weight of the coating composition.

The coating composition may also incorporate one or more optional curing agents (e.g., crosslinking resins, sometimes referred to as "crosslinkers"). The choice of particular crosslinker typically depends on the particular product being formulated. For example, some coatings are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of each of BPA, BPF, BPS, glycidyl ether compounds thereof (e.g., BADGE), and epoxy novolacs.

Any of the well-known, hydroxyl-reactive curing resins can be used. For example, phenoplast, blocked isocyanates, and aminoplast curing agents may be used, as well as combinations thereof. Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins. One specific example of a suitable aminoplast crosslinker is the fully alkylated melamine-formaldehyde resin commercially available from Cytec Industries, Inc. under the trade name of CYMEL 303.

As examples of other generally suitable curing agents are the blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have a number-average molecular weight of at least about 300, more preferably at least about 650, and even more preferably at least about 1,000.

The use of phenolic crosslinker is preferred in certain embodiments.

Carboxyl-reactive crosslinkers may also be used, especially, for example, to yield styrene-free coating compositions having suitably high flexibility. A detailed discussion of suitable such crosslinkers are provided in U.S. Prov. App. No. 64/410,255 filed on Oct. 19, 2016. Beta-hydroxyalkylamides are preferred examples of carboxyl-reactive crosslinkers. Some examples of such compounds include: bis[N,N-di(β-hydroxy-ethyl)]adipamide, bis[N,N-di(β-hydroxy-propyl)]succinamide, bis[N,N-di(β-hydroxy-ethyl)]azelamide, bis[N,N-di(β-hydroxy-propyl)]adipamide, bis[N-methyl-N-(β-hydroxy-ethyl)]oxamide, and mixtures thereof. Examples of commercially available beta-hydroxyalkylamides include the Primid QM-1260 and PRIMID XL-552 products available from EMS.

The concentration of the curing agent (e.g., crosslinker) in the coating composition may depend on the type of curing agent, the time and temperature of the bake, and the molecular weights of the copolymer particles. If used, the crosslinker is typically present in an amount of up to about 50% by weight, preferably up to about 30% by weight, and more preferably up to about 15% by weight. If used, the crosslinker is typically present in an amount of at least about 0.1% by weight, more preferably at least about 1% by weight, and even more preferably at least about 1.5% by weight. These weight percentages are based on the total resin solids weight of the coating composition.

In some embodiments, the coating composition may be cured without the use of an external crosslinker (e.g., without phenolic crosslinkers). Additionally, the coating composition may be substantially free of formaldehyde and formaldehyde-containing materials, essentially free of these compounds, essentially completely free of these compounds, or even completely free of these compounds.

In preferred embodiments, the coating composition is also substantially free, essentially free, essentially completely free, or completely free of any structural units derived from BPA, BPF, and/or BPS, including any diepoxides thereof (e.g., diglycidyl ethers thereof such as the diglycidyl ether of BPA ("BADGE")). In addition, the coating composition is preferably substantially free, essentially free, essentially completely free, or completely free of structural units derived from a dihydric phenol, or other polyhydric phenol, having estrogenic agonist activity great than or equal to that of 4,4'-(propane-2,2-diyl)diphenol. More preferably, the coating composition is substantially free or completely free of any structural units derived from a dihydric phenol, or other polyhydric phenol, having estrogenic agonist activity greater than or equal to that of BPS. In some embodiments, the coating composition is substantially free or completely free of any structural units derived from a bisphenol.

In preferred embodiments, the coating composition is substantially free or completely free of halogenated monomers (whether free or polymerized), such as chlorinated vinyl monomers.

The coating composition may also optionally be rheologically modified for different coating applications. For example, the coating composition may be diluted with additional amounts of aqueous carrier to reduce the total solids content in the coating composition. Alternatively, portions of the aqueous carrier may be removed (e.g., evaporated) to increase the total solids content in the coating composition. The final total solids content in the coating composition may vary depending on the particular coating application used (e.g., spray coating), the particular coating use (e.g., for interior can surfaces), the coating thickness, and the like.

In some embodiments, such as for certain spray coating applications (e.g., inside spray for food or beverage cans including, e.g., aluminum beverage cans), the coating composition may have a total solids weight greater than about 5%, more preferably greater than about 10%, and even more preferably greater than about 15%, based on the total weight of the coating composition. In these embodiments, the coating composition may also have a total solids weight less than about 40%, more preferably less than about 30%, and even more preferably less than about 25%, based on the total weight of the coating composition. In some of these embodiments, the coating composition may have a total solids weight ranging from about 18% to about 22%. The aqueous carrier may constitute the remainder of the weight of the coating composition.

If desired, the coating composition may also include one or more other optional polymers, such as, for example, one or more acrylic polymers, alkyd polymers, epoxy polymers, polyolefin polymers, polyurethane polymers, polysilicone polymers, polyester polymers, and copolymers and mixtures thereof.

The aqueous carrier of the coating composition includes water and may further include one or more optional organic solvents (e.g., one or more water-miscible solvents). In some embodiments, water constitutes greater than about 20% by weight, more preferably greater than about 35% by weight, and even more preferably greater than about 50% by weight of the total weight of the aqueous carrier. In some embodiments, water constitutes 100% or less, less than about 95% by weight, or less than about 90% by weight of the total weight of the aqueous carrier.

While not intending to be bound by theory, the inclusion of a suitable amount of an organic solvent can be advantageous, in some embodiments (e.g., for certain coil coating applications to modify flow and leveling of the coating composition, control blistering, and maximize the line speed of the coil coater). Accordingly, in certain embodiments, organic solvent may constitute greater than 0%, more preferably greater than about 5%, and even more preferably greater than about 10% by weight of the aqueous carrier, based on the total weight of the aqueous carrier. In these embodiments, organic solvent may also constitute less than about 60%, more preferably less than about 50%, and even more preferably less than about 40% by weight of the aqueous carrier, based on the total weight of the aqueous carrier.

The coating composition preferably has a viscosity suitable for a given coating application. In some embodiments, the coating composition may have an average viscosity greater than about 5 seconds, more preferably greater than about 10 seconds, and even more preferably greater than about 15 seconds, based on the Viscosity Test described below (Ford Viscosity Cup #4 at 25° C.). In some embodiments, the coating composition may also have an average viscosity less than about 40 seconds, more preferably less than about 30 seconds, and even more preferably less than about 25, based on the Viscosity Test described below.

The coating composition of the present invention may be applied to a variety of different substrates using a variety of different coating techniques (e.g., spray coating, roll coating, wash coating, dipping, etc.). In certain preferred embodiments, the coating composition is applied as an inside spray coating composition. As briefly described above, cured coatings formed from the coating composition are particularly suitable for use on metal food and beverage cans (e.g., two-piece cans, three-piece cans, and the like). Two-piece cans (e.g., two-piece beer or soda cans and certain food cans) are typically manufactured by a drawn and ironing ("D&I") process. The cured coatings are also suitable for use in food or beverage contact situations (collectively referred to herein as "food-contact"), and may be used on the inside or outside of such cans.

The disclosed coating compositions may be present as a layer of a mono-layer coating system or as one or more layers of a multi-layer coating system. The coating composition can be used as a primer coat, an intermediate coat, a top coat, or a combination thereof. The coating thickness of a particular layer and of the overall coating system will vary depending upon the coating material used, the substrate, the coating application method, and the end use for the coated article. Mono-layer or multi-layer coating systems including one or more layers formed from the disclosed coating composition may have any suitable overall coating thickness, but will typically have an overall average dry coating thickness of from about 1 to about 60 micrometers and more typically from about 2 to about 15 micrometers. Typically, the average total coating thickness for rigid metal food or beverage can applications will be about 3 to about 10 micrometers. Coating systems for use on closures (e.g., twist-off metal closures) for food or beverage containers may have an average total coating thickness up to about 15 micrometers. In certain embodiments in which the coating composition is used as an interior coating on a drum (e.g., a drum for use with food or beverage products), the total coating thickness may be approximately 25 micrometers.

The metal substrate used in forming rigid food or beverage cans, or portions thereof, typically has a thickness in the range of about 125 micrometers to about 635 micrometers. Electro tinplated steel, cold-rolled steel and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The disclosed coating compositions may be applied to a substrate either prior to, or after, the substrate is formed into an article such as, for example, a food or beverage container or a portion thereof. In one embodiment, a method of forming food or beverage cans is provided that includes: applying a coating composition described herein to a metal substrate (e.g., applying the composition to the metal substrate in the form of a planar coil or sheet), hardening the composition, and forming (e.g., via stamping) the substrate into a packaging container or a portion thereof (e.g., a food or beverage can or a portion thereof). For example, two-piece or three-piece cans or portions thereof such as riveted beverage can ends (e.g., soda or beer cans) with a cured coating of the disclosed coating composition on a surface thereof can be formed in such a method. In another embodiment, a method of forming food or beverage cans is provided that includes: providing a packaging container or a portion thereof (e.g., a food or beverage can or a portion thereof), applying a coating composition described herein to the inside, outside or both inside and outside portions of such packaging container or a portion thereof (e.g., via spray application, dipping, etc.), and hardening the composition.

After applying the coating composition onto a substrate, the composition can be cured using a variety of processes, including, for example, oven baking by either conventional or convectional methods, or any other method that provides an elevated temperature suitable for curing the coating. The curing process may be performed in either discrete or combined steps. For example, substrates can be dried at ambient temperature to leave the coating compositions in a largely uncrosslinked state. The coated substrates can then be heated to fully cure the compositions. In certain instances, the disclosed coating compositions may be dried and cured in one step.

The cure conditions will vary depending upon the method of application and the intended end use. The curing process may be performed at any suitable temperature, including, for example, oven temperatures in the range of from about 100° C. to about 300° C., and more typically from about 177° C. to about 250° C. If a metal coil is the substrate to be coated, curing of the applied coating composition may be conducted, for example, by heating the coated metal substrate over a suitable time period to a peak metal temperature ("PMT") of preferably greater than about 177° C. More preferably, the coated metal coil is heated for a suitable time period (e.g., about 5 to 900 seconds) to a PMT of at least about 218° C.

In some embodiments, the coating composition is an inside spray coating composition capable of being spray applied on an interior of a food or beverage can (e.g., a 2-piece food or beverage can) to effectively, and evenly, coat the substrate and form a continuous cured coating (e.g., a coating that exhibits a suitably low initial metal exposure value, thereby indicating that the substrate has been effectively coated and is free of unsuitable pores or gaps in the coating).

For interior food-contact coatings, and interior coatings for soda cans in particular, preferred Tg for the cured coating include those greater than about 50° C., more preferably greater than about 60° C., even more preferably greater than about 70° C., and in some embodiments, greater than about 80° C. Preferred Tg for the cured coating include those less than about 120° C., more preferably less than about 115° C., even more preferably less than about 110° C., and in some embodiments, less than about 100° C. The glass transition temperature is preferably measured by differential scanning calorimetry (DSC).

In some embodiments, the cured coating preferably exhibits desired properties for use as an interior food-contact coating (e.g., inside spray coating) for food and beverage containers. For example, the cured coating preferably gives a global extraction of less than about 25 parts-per-million (ppm), and more preferably less than about 10 ppm, and even more preferably less than about 1 ppm, pursuant to the Global Extraction test below. Additionally, the cured coating preferably exhibits a metal exposure of less than about 5 milliamps (mA), more preferably less than about 2 mA, and even more preferably less than about 1 mA, pursuant to the Initial Metal Exposure test below. In addition, the cured coating is preferably free of or substantially free of blush (e.g., exhibits a blush rating of at least 8, more preferably at least 9, and optimally 10) pursuant to the Blush test described below.

As discussed previously herein, it was a surprising and unexpected result that surfactant neutralized with a metallic base could be used to produce an emulsion polymerized latex polymer that, when used as the primary film former of a thermally cured coating, resulted in a cured coating that did not exhibit any appreciable blush. In some embodiments, thermally cured coatings formed from coating compositions described herein do not exhibit any appreciable blush (e.g., whitening) to the unaided eye (when tested, for example, using any of the blush testing procedures disclosed herein), even though the coating composition includes an amount of metal atom (selected from Na, K, Li, Mg, or any of the other metal atoms disclosed herein associated with a metallic base) associated with the use of metallic base neutralized surfactant disclosed herein.

Flexibility is also important for inside spray coatings, as well as other food or beverage can coatings, so that the coating can deflect with the metal substrate during post-cure fabrication steps (necking and dome reformation) and if the can is dropped from a reasonable height during transport or use. In some preferred embodiments, the cured coating preferably exhibits a metal exposure less than about 3.5 mA, more preferably less than about 2.5 mA, and even more preferably less than about 1.5 mA, pursuant to the Metal Exposure After Drop Damage test below.

The coating composition of the present disclosure also offers utility in other coating applications. These additional applications include, but are not limited to, wash coating, sheet coating, and side seam coatings (e.g., food can side seam coatings). Other commercial coating application and curing methods are also envisioned, for example, electrocoating, extrusion coating, laminating, powder coating, and the like. The coating composition may also be useful in medical or cosmetic packaging applications, including, for example, on surfaces of metered-dose inhalers ("MDIs"), including on drug-contact surfaces.

Polymers and coating compositions such as those described in the Examples may be evaluated using a variety of tests including:

1. Viscosity Test

This test measures the viscosity of a latex emulsion or coating composition for rheological purposes, such as for sprayability and other coating application properties. The test was performed pursuant to ASTM D1200-88 using a Ford Viscosity Cup #4 at 25° C. The results are measured in the units of seconds.

2. Curing Conditions

For beverage inside spray bakes, the curing conditions involve maintaining the temperature measured at the can dome at 188° C. to 210° C. for 45 seconds (e.g., 193° C. for 45 seconds). For beverage end coil bakes, the curing conditions involve the use of a temperature sufficient to provide a peak metal temperature within the specified time (e.g., 10 seconds at 204° C. means 10 seconds, in the oven, for example, and a peak metal temperature achieved of 204° C.). The constructions cited were evaluated by tests as follows.

3. Initial Metal Exposure

This test method determines the amount of the inside surface of the can that has not been effectively coated by the sprayed coating. This determination is made through the use of an electrically conductive solution (1% NaCl in deionized water). The interior "inside spray" coating is typically applied using a high pressure airless spray. The following film weights are typically used: 1.6 grams per square meter ("gsm") for a beer can, 2.3 gsm for a soda can, and 3.4 gsm for a can intended for use in packaging a "hard-to-hold" product.

The coated can is filled with this room-temperature conductive solution, and an electrical probe is attached in contact to the outside of the can (uncoated, electrically conducting). A second probe is immersed in the salt solution in the middle of the inside of the can.

If any uncoated metal is present on the inside of the can, a current is passed between these two probes and registers as a value on an LED display of a suitable measurement apparatus. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings give metal exposure values of less than 3 mA, more preferred values of less than 2 mA, and even more preferred values of less than 1 mA. Commercially acceptable metal exposure values are typically less than 2.0 mA on average.

4. Can Formation

This is a flexibility test for a coating, and correlates to how an inside-spray coating will withstand a can formation process (e.g., necking steps). In this test, the coated can undergoes a can formation process, including a necking step and bottom dome formation. The formed can is then tested in the electrically conductive solution following the same steps discussed above in the Initial Metal Exposure test.

5. Metal Exposure After Drop Damage

Drop damage resistance measures the ability of the coated container to resist cracks after being in conditions simulating dropping of a filled can. The presence of cracks is measured by passing electrical current via an electrolyte solution, as previously described in the Initial Metal Exposure section. A coated container is filled with the electrolyte solution (1% NaCl in deionized water) and the initial metal exposure is recorded. The electrolyte solution is removed and the can is then filled with room-temperature tap water. For two-piece "inside spray" beverage cans, the film weights described in the Initial Metal Exposure test can be used.

The water-filled can, which does not include a "top" can end, is dropped through a cylindrical tube having a 2 and ⅞ inch internal diameter, can bottom down, onto an impact wedge (e.g., an inclined plane angled upwards at 45 degrees). The impact wedge is positioned relative to the tube such that a dent is formed in the rim area where the can bottom end meets the sidewall (typically referred to as the "chime" of a beverage can). The water-filled can is dropped through the tube from a 24-inch height (as measured between the can bottom and the point of impact on the impact wedge) onto an inclined plane, causing a dent in the chime area. The can is then turned 180 degrees, and the process is repeated.

Water is then removed from the can and metal exposure is again measured as described above. If there is no damage, no change in current (mA) will be observed relative to the Initial Metal Exposure value. Typically, an average of 6 or 12 container runs is recorded. The metal exposures results for before and after the drop are reported as absolute values. The lower the milliamp value, the better the resistance of the coating to drop damage. Preferred coatings give metal exposure values after drop damage of less than 3.5 mA, more preferred values of less than 2.5 mA, and even more preferred values of less than 1.5 mA.

6. Adhesion

Adhesion testing is performed to assess whether the coating adheres to the coated substrate. The adhesion test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure (best), a rating of "9" indicates 90% of the coating remains adhered, a rating of "8" indicates 80% of the coating remains adhered, and so on. Adhesion ratings of 10 are typically desired for commercially viable coatings.

7. Blush Resistance

Blush resistance measures the ability of a coating to resist attack by various solutions. Typically, blush is measured by the amount of solution (e.g., water) absorbed into a coated film. When the film absorbs water, it generally becomes cloudy or looks white. Blush is generally measured visually using a scale of 0-10 where a rating of "10" indicates no blush (best) and a rating of "0" indicates complete whitening of the film (worst). Blush ratings of 7 or higher are typically desired for commercially viable coatings, and optimally 9-10.

To assess blush, the coating composition to be assessed is spray applied using an airless sprayer to a standard aluminum beverage can.

8. Corrosion Resistance

These tests measure the ability of a coating to resist attack by solutions of different levels of aggressiveness. Briefly, a given coating is subjected to a particular solution, as described below, and then measured for adhesion and blush resistance, each also described below. For each test, a result is given using a scale of 0-10, based on the Adhesion Resistance, Blush Resistance, and/or Bush Adhesion Resistance, where a rating of "10" is best and a rating of "0 is worst.

A. Deionized Water

Deionized water is heated to 82° C. Coated panels are immersed in the heated solution for 30 minutes and then removed, rinsed, and dried. Samples are then evaluated for adhesion and blush, as previously described.

B. Acetic Acid Solution

A 3% solution of acetic acid (C2H4O2) in deionized water is prepared and heated to 100° C. Coated panels are immersed in the heated solution for 30 minutes and then removed, rinsed, and dried. Samples are then evaluated for adhesion and blush, as previously described.

C. Citric Acid Solution

A 2% solution of citric acid (C6H8O7) in deionized water is prepared and heated while subjected to a pressure sufficient to achieve a solution temperature of 121° C. Coated panels are immersed in the heated solution for 30 minutes and then removed, rinsed, and dried. Samples are then evaluated for adhesion and blush, as previously described.

D. Cider Solution

A cider solution of 32.4 grams/liter malic acid. 9.6 grams/liter lactic acid, 12.9 grams/liter acetic acid, and 125 milligrams/liter sodium sulfite is prepared and heated to 40° C. Coated panels are immersed in the heated solution for 24 hours and then removed, rinsed, and dried. Samples are then evaluated for adhesion and blush, as previously described.

9. Pasteurization

The pasteurization test determines how a coating withstands the processing conditions for different types of food products packaged in a container. Typically, a coated substrate is immersed in a water bath and heated for 5-60 minutes at temperatures ranging from 65° C. to 100° C. For the present evaluation, the coated substrate was immersed in either a deionized water bath for 45 minutes at 85° C., or a 3% solution of acetic acid (C2H4O2) in deionized water for 30 minutes to 100° C. Coated panels are immersed in the heated solution for 30. The coated substrate was then removed from the bath and tested for coating adhesion and blush as described above. Commercially viable coatings preferably provide adequate pasteurization resistance with perfect adhesion (rating of 10) and blush ratings of 5 or more, optimally 9-10.

10. Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. The procedure is similar to the Pasteurization test. Testing is accomplished by subjecting the substrate to heat ranging from 105–130° C. and pressure ranging from 0.7 to 1.05 kilograms/square-centimeter for a period of 15 to 90 minutes.

For the present evaluation, the coated substrate is immersed in a 2% solution of citric acid (C6H8O7) in deionized water (the above-discussed Citric Acid Solution), and subjected to heat of 121° C. (250° F.) and pressure of 1.05 kilograms/square-centimeter for a period of 90 minutes. The coated substrate is then tested for adhesion and blush as described above. In food or beverage applications requiring retort performance, adhesion ratings of 0 and blush ratings of 3 or less are typically desired for commercially viable coatings.

11. Glass Transition Temperature

Samples for differential scanning calorimetry ("DSC") testing may be prepared by first applying the liquid resin composition onto aluminum sheet panels. The panels are then baked in a Fisher Isotemp electric oven for 20 minutes at 300° F. (149° C.) to remove volatile materials. After cooling to room temperature, the samples are scraped from the panels, weighed into standard sample pans and analyzed using the standard DSC heat-cool-heat method. The samples are equilibrated at −60° C., then heated at 20° C. per minute to 200° C., cooled to −60° C., and then heated again at 20° C. per minute to 200° C. Glass transitions are calculated from the thermogram of the last heat cycle. The glass transition is measured at the inflection point of the transition.

12. Global Extraction

The global extraction test is designed to estimate the total amount of mobile material that can potentially migrate out of a coating and into food packed in a coated can. Typically coated substrate is subjected to water or solvent blends under a variety of conditions to simulate a given end use. Acceptable extraction conditions and media can be found in 21 CFR § 175.300 paragraphs (d) and (e). The allowable global extraction limit as defined by the FDA regulation is 50 parts per million (ppm).

The extraction procedure used in the current invention is described in 21 CFR § 175.300 paragraph (e)(4)(xv) with the following modifications to ensure worst-case scenario performance: (1) the alcohol (ethanol) content was increased to 10% by weight, and (2) the filled containers were held for a 10-day equilibrium period at 37.8° C. (100° F.). These conditions are per the FDA publication "Guidelines for Industry" for preparation of Food Contact Notifications.

The coated beverage can is filled with 10% by weight aqueous ethanol and subjected to pasteurization conditions (65.6° C., 150° F.) for 2 hours, followed by a 10-day equilibrium period at 37.8° C. (100° F.). Determination of the amount of extractives is determined as described in 21 CFR § 175.300 paragraph (e) (5), and ppm values were calculated based on surface area of the can (no end) of 44 square inches with a volume of 355 milliliters. Preferred coatings give global extraction results of less than 50 ppm, more preferred results of less than 10 ppm, even more preferred results of less than 1 ppm. Most preferably, the global extraction results are optimally non-detectable.

Exemplary Embodiments

Embodiment 1 is a water-based food or beverage can coating composition (e.g., an inside spray food or beverage can coating composition), wherein the coating composition comprises:

a latex polymer formed by polymerizing (e.g., by emulsion polymerizing) an ethylenically unsaturated monomer component in an aqueous media the presence of a first surfactant, wherein the first surfactant comprises an anionic surfactant, a zwitterionic surfactant, or a mixture thereof that includes an acid group neutralized with a metallic base; and an optional crosslinker.

Embodiment 2 is the coating composition of embodiment 1, wherein the coating composition contains, on a solids basis, less than 10% by weight, if any, of an epoxy polymer.

Embodiment 3 is the coating composition of embodiment 1 or 2 wherein the wherein the latex polymer is substantially free of acrylamide-type monomers, and wherein the coating composition is optionally substantially free of acrylamide-type monomers.

Embodiment 4 is the coating composition of any preceding embodiment, wherein the latex polymer is substantially free of oxirane-functional monomers, and wherein the coating composition is optionally substantially free of oxirane-functional monomers.

Embodiment 5 is the coating composition of any preceding embodiment, wherein the latex polymer is substantially free of styrene, and wherein the coating composition is optionally substantially free of styrene.

Embodiment 6 is the coating composition of any preceding embodiment, wherein the latex polymer is substantially free of bisphenol A, bisphenol F, and Bisphenol S, and wherein the coating composition is optionally substantially free of bisphenol A, bisphenol F, and Bisphenol S.

Embodiment 7 is the coating composition of any preceding embodiment, wherein the latex polymer is substantially free of bisphenols, and wherein the coating composition is optionally substantially free of bisphenols.

Embodiment 8 is the coating composition of any preceding embodiment, wherein the latex polymer is substantially free of halogenated monomers (e.g., vinyl chloride), and wherein the coating composition is optionally substantially free of halogenated monomers.

Embodiment 9 is the coating composition of any preceding embodiment, wherein the coating composition includes at least 50% by weight of the latex polymer, based on the total weight of resin solids in the coating composition.

Embodiment 10 is the coating composition of any preceding embodiment, wherein the coating composition includes at least 90% by weight of the latex polymer, based on the total weight of resin solids in the coating composition.

Embodiment 11 is the coating composition of any preceding embodiment, wherein the coating composition includes the crosslinker, and wherein the crosslinker is selected from one or more of a phenolic crosslinker, a blocked isocyanate crosslinker, or an aminoplast crosslinker.

Embodiment 12 is the coating composition of any preceding embodiment, wherein the coating composition includes the crosslinker, and wherein: (i) the crosslinker comprises a carboxyl-reactive crosslinker and (ii) the latex polymer includes acid groups.

Embodiment 13 is the coating composition of embodiment 12, wherein the carboxyl-reactive crosslinker comprises a beta-hydroxyalkylamide compound.

Embodiment 14 is the coating composition of any preceding embodiment, wherein the coating composition, when spray applied via airless spray application to an interior of an aluminum beverage can at an average cured coating thickness of 4 grams per square meter and cured for 45 second in a 193° C. oven, does not exhibit any whitening visible to the unaided human eye after retort in deionized water for 30 minutes at 121° C.

Embodiment 15 is the coating composition of any preceding embodiment, wherein the coating composition, when spray applied via airless spray application to an interior of an aluminum beverage can at an average cured coating thickness of 4 grams per square meter and cured for 45 second in a 193° C. oven, does not exhibit any whitening visible to the unaided human eye after retort in 2% citric acid solution for 30 minutes at 121° C.

Embodiment 16 is the coating composition of any preceding embodiment, wherein the coating composition, when spray applied via airless spray application to an interior of an aluminum beverage can at an average cured coating thickness of 4 grams per square meter and cured for 45 second in a 193° C. oven, passes less than 3.5 mA, less than 2.5 mA, or less than 1.5 mA of current when tested pursuant to the Metal Exposure After Drop Damage test disclosed herein.

Embodiment 17 is the coating composition of any preceding embodiment, wherein the metallic base includes aluminum, calcium, lithium, magnesium, sodium, or potassium.

Embodiment 18 is the coating composition of any preceding embodiment, wherein the metallic base comprises sodium hydroxide.

Embodiment 19 is the coating composition of any preceding embodiment, wherein the coating composition includes at least 0.5% by weight of the first surfactant, based on the total combined weight of first surfactant and the ethylenically unsaturated monomer component.

Embodiment 20 is the coating composition of any preceding embodiment, wherein the first surfactant has a number average molecular weight of less than 1,000 Daltons or less than about 500 Daltons.

Embodiment 21 is the coating composition of any preceding embodiment, wherein the first surfactant is saturated.

Embodiment 22 is the coating composition of any preceding embodiment, wherein the first surfactant includes at least one heteroatom in a portion other than a neutralized acid group.

Embodiment 23 is the coating composition of any preceding embodiment, wherein the first surfactant includes one or more heteroatom-containing linkages (e.g., condensation linkages).

Embodiment 24 is the coating composition of any preceding embodiment, wherein the first surfactant includes one or more carbonyl groups.

Embodiment 25 is the coating composition of any preceding embodiment, wherein the first surfactant includes one or more ester linkages.

Embodiment 26 is the coating composition of any preceding embodiment, wherein the first surfactant is a sulfosuccinate-type surfactant.

Embodiment 27 is the coating composition of any preceding embodiment, wherein the first surfactant comprises dioctyl sodium sulfosuccinate.

Embodiment 28 is the coating composition of any preceding embodiment, wherein the ethylenically unsaturated monomer component includes a multi-ethylenically unsaturated monomer.

Embodiment 29 is the coating composition of any preceding embodiment, wherein the ethylenically unsaturated monomer component includes at least: 5%, 6%, 7%, 8%, 9%, 10%, 11%, 12%, 13%, 14%, or 15% by weight of multi-ethylenically unsaturated monomer.

Embodiment 30 is the coating composition of any preceding embodiment, wherein the aqueous monomer the ethylenically unsaturated monomer component is polymerized in the aqueous media in the presence of both the first surfactant and a second surfactant.

Embodiment 31 is the coating composition of any preceding embodiment, wherein the second surfactant is a non-ionic surfactant.

Embodiment 32 is the coating composition of embodiment 31, wherein the non-ionic surfactant is ethoxylated.

Embodiment 33 is the coating composition of embodiments 31 or 32 wherein the non-ionic surfactant comprises a sucrose ester, sorbitan ester, alkyl glycoside, polyglycerol ester, or mixture thereof.

Embodiment 34 is the coating composition of any of embodiments 31 to 33, wherein the non-ionic surfactant includes one or more hydroxyl groups.

Embodiment 35 is the coating composition of embodiment 30, wherein the first surfactant is an anionic surfactant and the second surfactant is a different anionic surfactant neutralized with a fugitive base.

Embodiment 36 is the coating composition of embodiment 35, wherein the fugitive base comprises an amine.

Embodiment 37 is the coating composition of any preceding embodiment, wherein the latex polymer has a glass transition temperature of from about 50° C. to about 120° C.

Embodiment 38 is the coating composition of any preceding embodiment, wherein the latex polymer is a multi-stage latex polymer.

Embodiment 39 is the coating composition of any preceding embodiment, wherein the latex polymer is a single-stage latex polymer.

Embodiment 40 is a method of coating a food or beverage container or portion thereof or food or beverage container substrate, comprising applying the coating composition of any preceding claim on a metal substrate prior to, or after, forming the metal substrate into a food or beverage container or a portion thereof.

Embodiment 41 is the method of embodiment 40, wherein the coating composition is spray applied on the metal substrate.

Embodiment 42 is the method of embodiment 41, wherein the coating composition is spray applied on an interior surface of an aluminum beverage can.

Embodiment 43 is the method of any of embodiments 40 to 42 further comprising curing the coating composition on the metal substrate to form a continuous cured coating having an average film thickness of from about 2 to about 15 microns.

Embodiment 44 is a food or beverage container, or a portion thereof, or a food or beverage container substrate resulting from the method of any of embodiment 40 to 44.

Embodiment 45 is a food or beverage container, or a portion thereof, having a metal substrate with the coating composition of any of embodiments 1 to 39 applied thereon.

Embodiment 46 is the food or beverage container, or a portion thereof, or food or beverage container substrate of embodiments 44 or 45 wherein the cured coating has a Tg of at least 50° C.

EXAMPLES

The following examples are offered to aid in understanding of the present invention and are not to be construed as limiting the scope thereof. It is to be understood that the particular examples, materials, amounts, and procedures are to be interpreted broadly in accordance with the scope and spirit of the inventions as set forth herein. Unless otherwise indicated, all parts and percentages are by weight.

Example 1: Latex Polymer

A latex polymer was prepared using the ingredients listed below in Table 1. An aqueous monomer pre-emulsion was first prepared using the ingredients of parts B1 and B2 listed below in Table 1. First, all of the constituents of part B1 were mixed together. Slow agitation was required at this stage to avoid the formation of foam. Once the mixture was homogeneous, the ingredients of part B2 were added to it under vigorous agitation at room temperature and the resulting mixture was stirred for 20 minutes. The medium turned white and was a liquid and the resulting monomer pre-emulsion was stable.

To prepare the latex polymer, the ingredients of part A1 were loaded in a six liter reactor equipped with a reflux condenser, thermometer, mechanical stirred, two metering pumps and nitrogen sparge. The reactor was then heated up to 80° C. under moderate agitation. Once at temperature, and five minutes before beginning addition of the aqueous monomer pre-emulsion described above, the premix part A2 was added to the reactor. The stable monomer pre-emulsion prepared from parts B1 and B2 and the initiator solution (premix part C) were then added in the reactor with two separate lines at a constant rate over 180 minutes at 80° C. and under agitation (120-150 revolutions per minute). Once the monomer addition was completed, part D was added and the reactor was held for 1 hour at 80° C. to reach complete conversion. Part E was then added in the reactor to reduce as much as possible the level of free monomers in the resin and then the reaction mixture was held one hour more.

At this stage, a post neutralization of the final latex can be envisaged to improve the stability and/or increase the viscosity of the latex. The reactor was then slowly cooled down to 40° C. and filtered to collect the resulting latex emulsion. The final latex had non-volatile content of 34-35% (1 g/30 min/180° C.) and an acid number of 80 mg KOH per gram resin.

TABLE 1

| | Ingredients | Amount (grams) |
|---|---|---|
| Part A1 (Reactor) | Water | 375.76 |
| | Polyethylene glycol sorbitan monolaurate (Glycosperse L-20 KFG surfactant) | 0.56 |
| | Dioctyl sodium sulfosuccinate (Aerosol OT 70 surfactant) | 0.70 |
| Part A2 Premix | Water | 13.15 |
| | Iron sulfate heptahydrate | 0.0017 |
| Part B1 | Tween 20 | 2.72 |
| | Aerosol OT 70 surfactant | 3.76 |
| | Water | 159.70 |
| Part B2 | Styrene | 119.34 |
| | Ethyl Acrylate | 106.75 |
| | Acrylic Acid | 34.16 |
| | Hydroxyl ethyl methacrylate | 30.96 |
| | Butanediol dimethacrylate | 51.67 |
| | Tertioamyl Hydroperoxyde (Luperox TAH 85) | 0.47 |
| Part C Premix | Isoascorbic Acid | 0.26 |
| | Dimethyl ethanol amine | 0.13 |
| | Water | 43.21 |
| Part D | Water | 46.97 |
| Part E Premix | Tertioamyl Hydroperoxyde (Luperox TAH 85) | 0.19 |
| | Isoascorbic Acid | 0.094 |
| | Dimethyl ethanol amine | 0.047 |
| | Iron sulfate heptahydrate | 0.0017 |
| | Water | 9.39 |
| | Total | 1,000 |

Example 2: Coating Composition

The Example 1 latex was evaluated as an internal coating for two-piece beverage cans. Phenolic resin was added to the Example 1 latex, which was diluted with a blend of solvent (ButylGlycol/Butanol/Amyl Alcohol) and water to reach a viscosity between 15 and 25 seconds (#4 ford cup at 25° C. Dimethylethanolamine (DMEA) can also be added to adjust the solid ratio/viscosity.

Each of the varnishes included in Table 2 were sprayed on standard aluminum beverage cans (at an amount suitable to achieve a 3-4 microns on average dry coating thickness) and baked for a total oven time of 3 minutes in a suitably configured oven (e.g., using the first three zones of a 4-stage oven, with the first zone (i.e., the "drying" zone) set at 125° C. and the second and third zones (i.e., the "curing" zones) set at 200° C.) to achieve a PMT of 193° C. for 45 seconds. Commercial inside spray BPA-based epoxy and inside spray acrylic latex coatings were included as controls. The latex control coating did not include a metallic base, but rather utilized amine base. The performance properties of the inside spray coatings were assessed as indicated in Table 2. As can be seen from the data, the coating composition of Example 2 performed comparably to the BPA-based epoxy control and better than the commercial latex coating.

TABLE 2

| | | Example 2 | Commercial Epoxy Coating | Commercial Latex Coating |
|---|---|---|---|---|
| Phenolic resin | | Yes | No | Yes |
| Film properties: | Cider | 9/10/10 | 10/10/10 | 3/5/4 |
| Lab simulant tests | Acetic Acid | 10/10/10 | 10/10/10 | 10/10/10 |
| Blush/Adhesion/Blistering | (Coca Cola soda test) | | | |
| Rating 0 to 10, with "10" | Pasteurization | 10/10/10 | 10/10/10 | 10/10/10 |

TABLE 2-continued

|  |  | Example 2 | Commercial Epoxy Coating | Commercial Latex Coating |
|---|---|---|---|---|
| being the best Application | Retort Citric Acid | 10/10/10 | 10/10/10 | 10/10/10 |
|  | Initial Metal Exposure (mA) | 0.5 | 0.1 | 0.1 |
| Flexibility | Metal Exposure After Drop Damage (mA) | 0.6 (pass) | 1.9 (pass) | 1.9 (pass) |

The complete disclosure of all patents, patent applications, and publications (including material safety data sheets, technical data sheets and product brochures for the raw materials and ingredients used in the Examples), and electronically available material cited herein are incorporated herein by reference as if individually incorporated. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

The disclosure of U.S. App. Ser. No. 62/096,572 is incorporated by reference, as well any PCT international application that claims priority to U.S. Provisional Application No. 62/387,129 (e.g., WO2016/105504).

The invention claimed is:

1. A water-based inside spray food or beverage can coating composition, wherein the coating composition comprises a latex polymer formed by polymerizing an ethylenically unsaturated monomer component in an aqueous media in the presence of a first surfactant and a second surfactant, wherein the first surfactant comprises an anionic surfactant, a zwitterionic surfactant, or a mixture thereof that includes an acid group neutralized with a metallic base, and wherein the second surfactant is a non-ionic surfactant;

wherein the latex polymer has a glass transition temperature of from 50° C. to 120° C., as measured by DSC;

wherein a film formed from the coating composition on a standard aluminum beverage can is blush resistant upon contact with water; and wherein the coating composition, when spray applied via airless spray application to an interior of an aluminum beverage can at an average cured coating thickness of 4 grams per square meter and cured in an oven under conditions that obtain a peak metal temperature of 193° C. for 45 seconds, passes less than 3.5 mA of current when tested pursuant to the Metal Exposure After Drop Damage test.

2. The coating composition of claim 1, wherein the coating composition includes at least 50% by weight of the latex polymer, based on the total weight of resin solids in the coating composition.

3. The coating composition of claim 1, wherein the coating composition includes at least 90% by weight of the latex polymer, based on the total weight of resin solids in the coating composition.

4. The coating composition of claim 1, wherein the coating composition includes a crosslinker, and wherein the crosslinker is selected from one or more of a phenolic crosslinker, a blocked isocyanate crosslinker, or an aminoplast crosslinker.

5. The coating composition of claim 1, wherein the coating composition includes a crosslinker, and wherein: (i) the crosslinker comprises a carboxyl-reactive crosslinker and (ii) the latex polymer includes acid groups.

6. The coating composition of claim 1, wherein the coating composition is substantially free of bisphenol A, bisphenol F, and Bisphenol S, and wherein the coating composition is substantially free of halogenated monomers.

7. The coating composition of claim 1, wherein the coating composition is substantially free of each of acrylamide-type monomers and oxirane-functional monomers.

8. The coating composition of claim 1, wherein the coating composition, when spray applied via airless spray application to an interior of an aluminum beverage can at an average cured coating thickness of 4 grams per square meter and cured in an oven under conditions that obtain a peak metal temperature of 193° C. for 45 seconds, does not exhibit any whitening visible to the unaided human eye after retort in deionized water for 30 minutes at 121° C.

9. The coating composition of claim 1, wherein the coating composition, when spray applied via airless spray application to an interior of an aluminum beverage can at an average cured coating thickness of 4 grams per square meter and cured in an oven under conditions that obtain a peak metal temperature of 193° C. for 45 seconds, does not exhibit any whitening visible to the unaided human eye after retort in 2% citric acid solution for 30 minutes at 121° C.

10. The coating composition of claim 1, wherein the coating composition, when spray applied via airless spray application to an interior of an aluminum beverage can at an average cured coating thickness of 4 grams per square meter in an oven under conditions that obtain a peak metal temperature of 193° C. for 45 seconds, passes less than 1.5 mA of current when tested pursuant to the Metal Exposure After Drop Damage test disclosed herein.

11. The coating composition of claim 1, wherein the metallic base includes aluminum, calcium, lithium, magnesium, sodium, or potassium.

12. The coating composition of claim 1, wherein the metallic base comprises sodium hydroxide.

13. The coating composition of claim 1, wherein the coating composition includes at least 0.5% by weight of the first surfactant, based on the total combined weight of the first surfactant and the ethylenically unsaturated monomer component.

14. The coating composition of claim 1, wherein the first surfactant has a number average molecular weight of less than 1,000 Daltons.

15. The coating composition of claim 1, wherein the first surfactant is saturated, and wherein the first surfactant includes one or more heteroatom-containing linkages.

16. The coating composition of claim 1, wherein the first surfactant includes one or more ester linkages.

17. The coating composition of claim 1, wherein the first surfactant is a sulfosuccinate-type surfactant.

18. The coating composition of claim 17, wherein the first surfactant comprises dioctyl sodium sulfosuccinate.

19. The coating composition of claim 1, wherein the ethylenically unsaturated monomer component includes a multi-ethylenically unsaturated monomer.

20. The coating composition of claim 1, wherein the ethylenically unsaturated monomer component includes more than 5% by weight of multi-ethylenically unsaturated monomer.

21. The coating composition of claim 1, wherein the non-ionic surfactant is ethoxylated.

22. The coating composition of claim 1, wherein the non-ionic surfactant comprises a sucrose ester, sorbitan ester, alkyl glycoside, polyglycerol ester, or mixture thereof.

23. The coating composition of claim 1, wherein the non-ionic surfactant includes one or more hydroxyl groups.

24. A method of coating a food or beverage container, comprising applying the coating composition of claim 1 on a metal substrate prior to, or after, forming the metal substrate into a food or beverage container or a portion thereof.

25. The method of claim 24, wherein the coating composition is spray applied on an interior surface of an aluminum beverage can and cured to form a continuous cured coating having an average film thickness of from about 2 to about 15 microns.

26. A food or beverage container, or a portion thereof, resulting from the method of claim 24.

27. A food or beverage container, or a portion thereof, having a metal substrate with a coating disposed thereon formed from the coating composition of claim 1.

28. The food or beverage container of claim 26, or a portion thereof, wherein the cured coating has a Tg of at least 50° C.

29. The method of claim 25, wherein the cured coating has a Tg of at least 50° C.

30. The coating composition of claim 1 wherein a film formed from the coating composition on a standard aluminum beverage can has a blush resistance of at least 9 upon contact with water according to the Blush Resistance Test.

31. The coating composition of claim 1 wherein a film formed from the coating composition on a standard aluminum beverage can has no visible blush upon contact with water.

* * * * *